March 10, 1970

C. J. CAIN 3,500,365

APPARATUS FOR REMOTELY DETERMINING THE ANGULAR
ORIENTATION, SPEED, AND/OR DIRECTION
OF ROTATION OF OBJECTS

Original Filed Oct. 11, 1965

INVENTOR
Charles J. Cain

BY Newton, Hopkins,
Jones & Ormsby

ATTORNEYS

March 10, 1970  C. J. CAIN  3,500,365
APPARATUS FOR REMOTELY DETERMINING THE ANGULAR
ORIENTATION, SPEED, AND/OR DIRECTION
OF ROTATION OF OBJECTS
Original Filed Oct. 11, 1965  2 Sheets-Sheet 2

INVENTOR
Charles J. Cain

BY: *Newton, Hopkins,*
*Jones & Ormsby*

ATTORNEYS

United States Patent Office

3,500,365
Patented Mar. 10, 1970

---

3,500,365
APPARATUS FOR REMOTELY DETERMINING THE ANGULAR ORIENTATION, SPEED, AND/OR DIRECTION OF ROTATION OF OBJECTS
Charles J. Cain, R.F.D. 1, Grifton, N.C. 28530
Continuation of application Ser. No. 494,560, Oct. 11, 1965. This application Nov. 12, 1968, Ser. No. 776,310
Int. Cl. G08c 19/06, 21/00
U.S. Cl. 340—196                                 6 Claims

ABSTRACT OF THE DISCLOSURE

A method of and apparatus for remotely determining the angular orientation, speed, and/or direction of rotation of objects wherein the method includes the steps of rotating a magnetic field about an axis of rotation coinciding with the axis of rotation of a magnetically conducting member and in the vicinity of the member, detecting the magnetic variations in the rotating magnetic field as it rotates about the axis of rotation to create an electrical output current whose relative electrical phase is dependent upon the angular orientation of the member.

The apparatus of the invention includes first means for producing a rotating magnetic field in the vicinity of a rotatable magnetically conducting member, the magnetic field having an axis of rotation coinciding with the axis of rotation of the member; and second means for detecting variations in the rotating magnetic field as it passes the member, the second means creating an electrical output current whose relative electrical phase is dependent upon the angular orientation of the member.

---

This is a continuation of Ser. No. 494,560 filed Oct. 11, 1965 and now abandoned.

This invention relates to remote means for determining the angular orientation, the speed and/or the direction of rotation of objects such as shafts, dial hands, and the like, and is more particularly concerned with a magnetic means for obtaining a signal that is indicative of the angular orientation, the speed, or the direction of rotation of the object to be monitored.

There has been considerable effort expended in providing means and apparatus for reading meters at a distance, for example through telephone lines and the like. Most of these previous meter reading means have required that some mechanical connection be made to the meter which means that the meter itself will have to be altered, and considerable time and expense will be involved in the use of the device. Moreover, the use of sliding electrical contacts in previous meter reading means has prevented the use of the reading means in explosive atmospheres; and in many instances, changes in the output signal from those previous meter reading means have occurred due to the result of aging of the components changing their mechanical and/or electrical characteristics.

Other meter reading devices have used photoelectric cells so that no mechanical connection is needed between the meter and the meter reader. However, these reading devices have not been satisfactory because a reliable source of light must be provided and the face of the photoelectric cell must be kept sufficiently clean so that the light impinging on the photoelectric cell will not be diminished sufficiently to give a false reading.

The apparatus of the present invention overcomes the above mentioned and other difficulties by providing a transducer unit that will indicate the orientation of the hand of a meter dial at any particular time without requiring mechanical connection to the meter and without the provision of unreliable devices such as photoelectric cells. The only connection with the meter is through a magnetic field; and, since many meters are encased in glass, the magnetic field can pass through the glass casing without requiring that the casing or the meter be tampered with in order to install the transducer of the present invention. In scanning the dial of a meter to determine the orientation of the hand, the magnetic field can be moved without using mechanical parts that must move relative to one another, thereby reducing areas of possible trouble with the meter reading device. Moreover, the elimination of any spark producing switches allows the device to be used in explosive atmospheres.

These and other features and advantages of the present invention will become apparent from consideration of the following specification when taken in conjunction with the accompanying drawings in which.

These figures and the following detailed description disclose a specific embodiment of the invention, but the invention is not limited to the details disclosed herein since it may be embodied in other equivalent forms.

In general terms, the present invention includes means for providing a rotating magnetic field with a reading means at the center of rotation of the magnetic field. Normally, there will be no signal induced in the reading means because the magnetic field is completely symmetrical, and has very low density at the center thereof due to the high reluctance of the air path through which the field normally passes; however, if a strip of magnetically conducting material is placed closely adjacent the reading means and extends to one edge of the rotating magnetic field, when the field crosses the magnetically conducting material, the material will provide a low reluctance path relative to the air gap through which the magnetic field passes in the absence of such material so that there will be a high flux density at the reading means to induce a signal in the reading means. The signal can then be monitored by any of several well known means so as to indicate the angular orientation of the magnetically conducting material, or, if desired, to indicate the speed and/or direction of rotation of the magnetically conducting material about its axis of rotation, the axis of rotation coinciding with the center of the rotating magnetic field.

Figure 1:
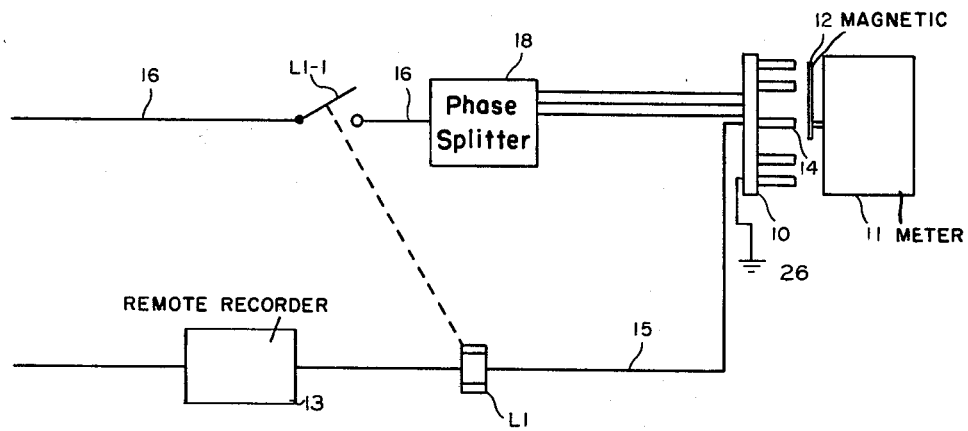
FIG. 1 is a schematic diagram showing a transducer according to the present invention in conjunction with a control circuit and a recording circuit therefor.

Referring now to FIG. 1 of the drawings, it will be seen that there is a transducer generally designated at 10, the transducer being adjacent to a meter 11 having a hand 12. There is a reading coil 14 at the center of the transducer 10, the reading coil 14 being connected to the wire 15 in which there is a relay L1 and a recording circuit 13 of conventional design.

The transducer 10 is also positioned so that the axis of rotation of the magnetic field coincides with the axis of rotation of the hand 12.

It will be understood that the wire 15 is from a source of electrical current, such as a telephone line or the like. With this arrangement, the wire 15 can be energized at any desired time to energize the relay L1 to close the relay contact L1–1 which is in a wire 16, and to activate the recording circuit 13.

The wire 16 is from a conventional single phase alternating current source and leads to a phase splitter 18. The phase splitter 18 converts the single phase current into a plurality of phases, for example, three phases, to provide the rotating magnetic field.

It will thus be seen that, when it is desired to read the meter 11, a voltage is placed on the wire 15 to energize the relay L1 and close the relay contact L1–1. When the contact L1–1 is closed, an alternating voltage will be placed on the wire 16 which will be split by the phase splitter 18 into a polyphase current, for example, three-phase current. As an inherent feature of polyphase current, a magnetic field will be generated that will rotate around the face of the transducer 10; and, when the rotating magnetic field crosses, or becomes parallel to, the dial hand 12, a voltage will be induced in the reading means 14 to give an indication that the dial hand has been scanned. If the hand 12 is not magnetizable, then a magnetically conducting paint or clip can be applied thereto to achieve the desired low reluctance path.

Figure 2:
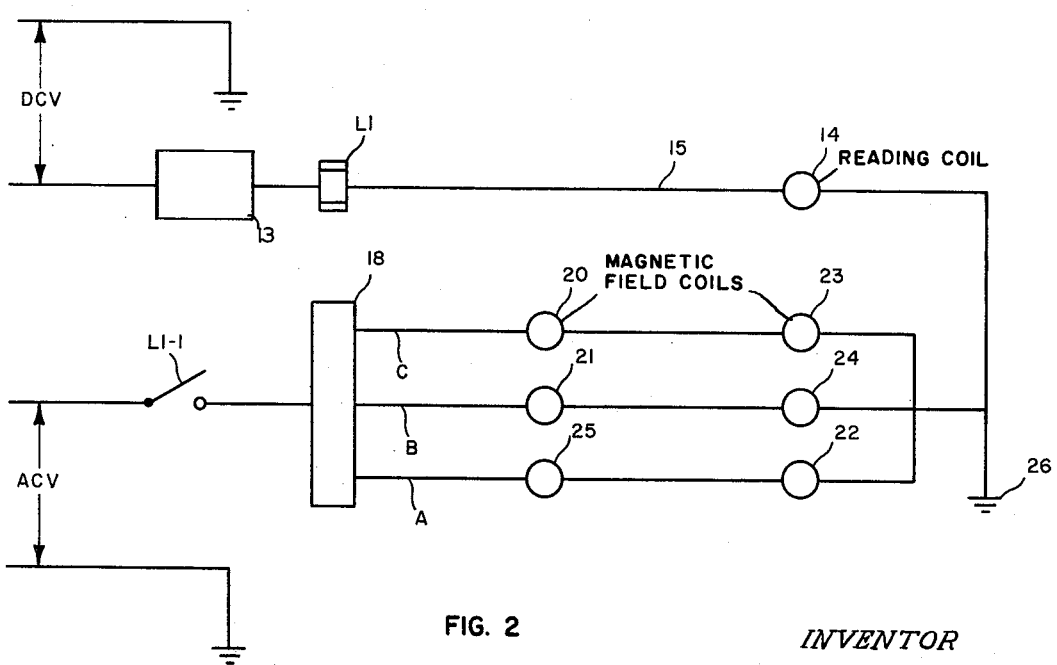
FIG. 2 is a schematic wiring diagram showing the connection of the transducer with the reading circuit.

Referring now to FIG. 2 of the drawings for a more detailed discussion of the circuit, it will be seen that the wire 16 is connected through the relay contact L1–1 to the phase splitter 18. The details of the phase splitter 18 are not shown herein, this being a conventional piece of apparatus well known by those skilled in the art, it being understood, however, that the phase splitter 18 can provide polyphase current, that is, two phase, three phase, or any other number of phases. Three phase current is, perhaps, preferable because three phase current will frequently be available from the conventional power lines so that the phase splitter 18 will not have to be used. If three phase current is available from the power line, the phase splitter 18 would be omitted, and there would be three contacts such as contact L1–1, one of the contacts L1–1 being in each of the phase wires.

The three lines coming from the phase splitter 18 are designated A, B, and C, which will also designate the three phases, phase A, phase B, and phase C. It will be observed that the wire A is connected to a coil 25 and to a diametrically opposed coil 22, both coils 25 and 22 being also connected to ground 26. Similarly, phase B is connected to ground 26; and, phase C is connected to a coil 20 and to a diametrically opposed coil 23, both coils 20 and 23 having their other side connected to the ground 26. The diametrically opposed coils 20 and 23, 21 and 24, and 22 and 25, are wound in opposite directions so that current flowing in the same direction through both coils will cause opposite polarity on the other end of the coils so that a magnetic field will be provided from one coil 20–22 to its respective diametrically opposed coil 23–25.

With this arrangement, it will be understood by those skilled in the art, that, when phase C reaches its peak voltage, there will be a magnetic field between the coils 20 and 23, one of the coils being a north pole and the other being a south pole; 120 electrical phase degrees later, when phase B reaches its peak voltage, there will be a strong magnetic field between the coils 21 and 24, one of the coils being a north pole and the other coil being a south pole; and, the same situation will be true for the coils 22 and 25 when phase A reaches its peak voltage. Thus, a rotating magnetic field is provided.

Figure 3:
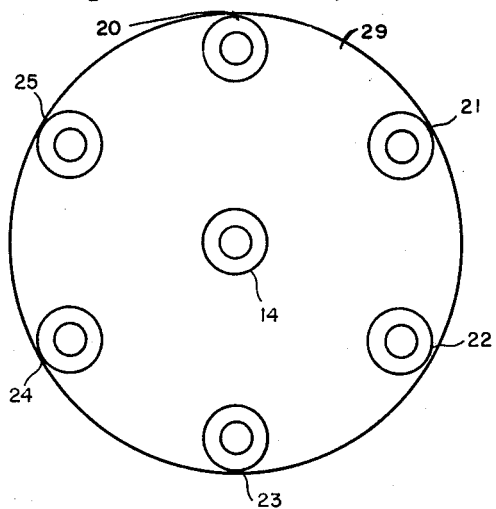
FIG. 3 is a face view of the transducer shown schematically in FIGS. 1 and 2.
Figure 4:
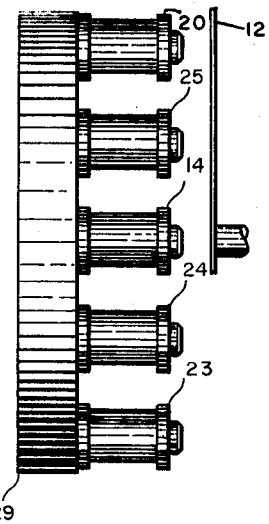
FIG. 4 is a side elevational view of the transducer of FIG. 3.

At the geometric center of the coils 20–25 and aligned with the axis of rotation of the hand 12, there is the reading coil 14 which, it will be seen, is connected to the wire 15 and to ground 26. The coil 14 is connected to the wire 15 and ground 26 in such a manner that current flowing through the coil 14 induces a polarity on its outer end opposite that of the outer end of the particular coil 20–25 at which the desired indication of hand 12 orientation is sought to be obtained. It is of course understood that no indication of hand 12 position will be indicated with the particular coil 20–25 diametrically opposite to the particular coil 20–25 at which the desired indication is sought since that polarity is the same as the polarity of the outer end of the coil 14. This aspect of the device can be better understood by referring to FIGS. 3 and 4 of the drawings. It will be seen that the coils 20–25 are spaced 60 degrees apart around a circular backing plate 29. The backing plate 29 is preferably of a magnetically conducting material, although non-magnetic materials would still provide an operable device. The magnetically conducting material is preferable in order to decrease the reluctance of the opposite side of the magnetic circuit to provide a greater flux density on the outer ends of the coils 20 through 25.

With the above described arrangement, it will be seen that, normally the magnetic flux will take a rather wide circuit from one of the coils (say, coil 20) to the diametrically opposed coil (say, coil 23) with only a few lines of force taking a path closer to the coils themselves. When a magnetic conductor, such as the dial hand 12, is placed adjacent to the coil 20, most of the lines of magnetic force will travel through the hand 12. Since one end of the hand 12 is very close to the reading coil 14, as the flux density increases with the increasing voltage of one particular phase (phase C) a voltage will be induced in the coil 14. This induced voltage will change the characteristics of the voltage already impressed on the coil 14, and, this change in voltage can be readily monitored by known techniques to either indicate the angular position of hand 12, the speed, or direction of rotation of the hand 12. Of particular importance is the phase difference between the voltage change induced in coil 14 and the voltage applied to any given one of coils 20–25. This phase difference will be proportional to the angular orientation of the hand 12 with respect to any convenient fixed reference direction (e.g., wtih respect to the radial line joining coil 14 with coil 20).

Figure 5:
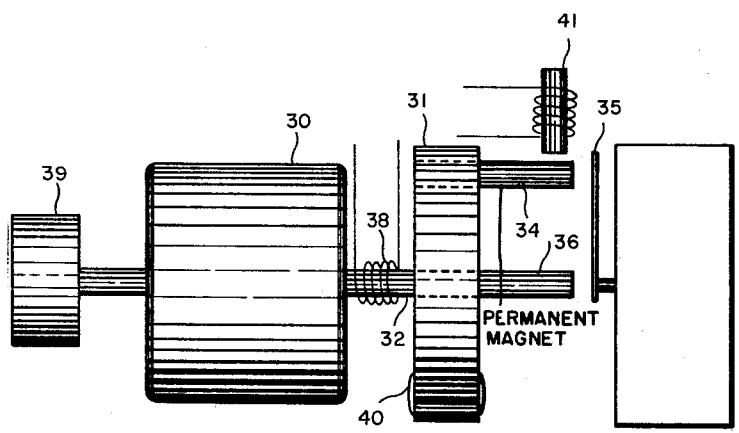
FIG. 5 is a side elevational view of a second embodiment of the invention.

FIG. 5 of the drawings shows a modified form of the invention in which the rotating magnetic field is provided mechanically rather than electrically. Here it will be seen that there is an electric motor 30 having a fly wheel 31 mounted on the shaft 32. At one point adjacent the periphery of the fly wheel 31, there is a permament magnet 34 extending from the fly wheel 31 toward the dial hand 35. The magnetic path is continued by an extension 36 of the shaft 32 and when the shaft extension 36 is aligned as shown, and the permanent magnet 34 is moving relative to the hand 35, there will be an increase in the flux density near the shaft 32; and, the change in flux density can be read by a coil 38 that is wound around the shaft 32. A governor or other speed control means 39 is connected to the shaft 32 of the motor 30 to assure a constant speed of rotation to give accurate readings from the hand 35 and, since the permanent magnet 34 will offbalance the fly wheel 31, there is a counter weight 40 to balance the fly wheel 31.

The signal given when the magnet 34 and shaft 36 are aligned with the hand 35 will be at one particular angle of rotation; however, there must be a zero point for the signal to be meaningful. To provide the zero point, there is a coil 41 placed adjacent the circle of travel of the magnet 34 so that, every time the magnet 34 passes the coil 41, a voltage will be induced to give a signal that can be taken as the zero signal. The phase difference between the zero signal and the reading signal will be indicative of the angular location of the hand 35 or upon a change in calibration, the speed and/or direction of rotation of the hand 35.

Figure 6:
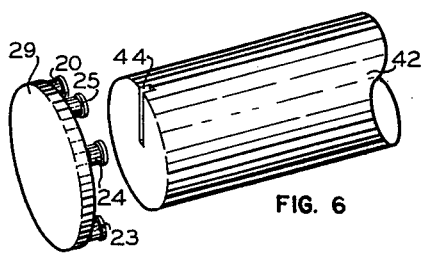
FIG. 6 is a partial perspective view showing the use of the transducer of FIG. 3 as an indicator of rotational speed of a shaft.

FIG. 6 shows the inventive concept being used to determine the angular position of a shaft 42. The shaft 42 has a radially extending slot 44 in the end 45 thereof. Thus, as the magnetic field is rotated by the transducer 10, it crosses the open slot 44 which shows a decrease in the magnetic flux density between the reading means 14 and the coils 20–25. This decrease in magnetic flux density can easily be monitored through the recording circuit 13 to indicate the angular position of the shaft 42, or, upon recalibration, the speed of rotation of the shaft 42.

It will of course be understood that the particular embodiments here presented are by way of illustration only, and are meant to be in no way restrictive; therefore, numerous changes and modifications may be made, and the full use of equivalents resorted to, without departing from the spirit or scope of the invention.

What is claimed is:

1. Apparatus for remotely detecting the orientation of a magnetic conducting member rotatable about an axis comprising:
   a polyphase current source for use by said apparatus;
   a current sensing means operatively associated with said apparatus;
   stationary support means having an axis coinciding with the axis of said member;
   a plurality of wire wound field coils carried by said support means in the vicinity of said member and equally spaced about the circumferential path defined as the member rotates about its axis, each of said coils connected to the polyphase current source in such a manner that said coils diametrically opposite each other have opposite magnetic polarities on their corresponding ends for producing a rotating magnetic field overlying the rotatable member and rotatable about an axis coinciding with the axis of the member; and
   a wire-wound coil reading means carried by said support means and axially aligned with the axis of the member, said reading coil having one end thereof in the vicinity of the member, said reading coil producing a current flow through said current sensing means in response to the change in magnetic flux density superimposed on said reading coil as said magnetic field rotates adjacent the rotatable member, the electrical phase of said current flow being determined by the angular orientation of the rotatable member.

2. In a system using a direct current source for selectively detecting the angular orientation, speed, and direction of rotation of a magnetically conducting member as it rotates about an axis of rotation and defines circumferential path;
   means for producing a magnetic field rotating in the vicinity of said member over the circumferential path and about an axis of rotation coinciding with said first mentioned axis of rotation; and
   reading coil means axially aligned with said first mentioned axis and connected to the direct current source in such a manner that the end of said reading coil means adjacent said member is oppositely in magnetic polarity from that portion of the rotating magnetic field with which a reading is desired to be made, said reading coil means effecting a change in the relative phase of current flow therethrough in response to the increase in flux density at the reading coil means produced through the magnetically conducted member as said magnetic field rotates thereby.

3. The device as set forth in claim 2 wherein said means for producing a magnetic field comprises electrical means.

4. The device set forth in claim 2 wherein said first mentioned means comprises a circular backing plate rotatable about an axis coinciding with said first mentioned axis, a motor rotatably carrying said plate for rotation about said axis, and magnetic producing means carried by said plate adjacent the periphery thereof, said field producing means comprising a permanent magnet having one end thereof movable along said circumferential path as said motor rotates said backing plate to produce a rotating magnetic field in the vicinity of said member.

5. The device as set forth in claim 4 wherein said reading means includes ferro-magnetic means aligned with the axis of rotation of said member and coil means encircling said ferro-magnetic means for detecting any variations in flux density through said ferro-magnetic means, said coil means connected to said direct current source in such manner that variations in flux density through said ferro-magnetic means produces a corresponding variations in the electrical phase of the current flow through said coil means.

6. Apparatus connectable to a polyphase current source and a direct current source for remotely detecting the orientation of a magnetic conducting member rotatable about an axis comprising:
   stationary support means having an axis coinciding with the axis of said member;
   a plurality of wire-wound field coils carried by said support means in the vicinity of said member and equally spaced about the circumferential path defined as the member rotates about its axis, each of said coils connected to the polyphase current source in such a manner that said coils diametrically opposite each other have opposite magnetic polarities on their corresponding ends for producing a rotating magnetic field overlying the rotatable member and rotatable about an axis coinciding with the axis of the member; and
   a wire-wound reading coil carried by said support means and axially aligned with the axis of the member, said reading coil having one end thereof in the vicinity of the member and connected to said direct current source in such manner that said end of said reading coil has a magnetic polarity opposite to that of the corresponding end of said field coil on which a reading is to be made, said reading coil producing a change in the phase of the current flow through said reading coil in response to the increase in magnetic flux density superimposed on said reading coil as said magnetic field rotates adjacent the rotatable member.

References Cited

UNITED STATES PATENTS

| | | | |
|---|---|---|---|
| 705,482 | 7/1902 | Thiermann | 340—196 |
| 2,403,889 | 7/1946 | Toro | 340—195 |
| 2,436,639 | 2/1948 | Faus | 340—196 |
| 2,446,290 | 8/1948 | Lovegrove | 340—198 |
| 2,704,353 | 3/1955 | Alkan | 340—198 |

THOMAS B. HABECKER, Primary Examiner

U.S. Cl. X.R.

340—180